United States Patent
Sumner

(10) Patent No.: US 10,900,511 B2
(45) Date of Patent: Jan. 26, 2021

(54) BED BASE WITH LOCKING CORNER

(71) Applicant: Hollywood Bed & Spring Mfg. Co., LLC, Commerce, CA (US)

(72) Inventor: Holden Sumner, Denton, NC (US)

(73) Assignee: Hollywood Bed & Spring Mfg. Co., LLC, Commerce, CA (US)

(*) Notice: Subject to any disclaimer, the term of this patent is extended or adjusted under 35 U.S.C. 154(b) by 181 days.

(21) Appl. No.: 16/028,946

(22) Filed: Jul. 6, 2018

(65) Prior Publication Data
US 2020/0011359 A1    Jan. 9, 2020

(51) Int. Cl.
*F16B 12/56* (2006.01)
*A47C 19/02* (2006.01)
*F16B 12/44* (2006.01)

(52) U.S. Cl.
CPC ............ *F16B 12/56* (2013.01); *A47C 19/021* (2013.01); *F16B 12/44* (2013.01); *F16B 2012/446* (2013.01)

(58) Field of Classification Search
CPC .... F16B 12/56; F16B 12/44; F16B 2012/446; F16B 12/60; A47C 19/021; A47C 19/005; A47C 19/02
See application file for complete search history.

(56) References Cited

U.S. PATENT DOCUMENTS

| 1,143,796 | A | * | 6/1915 | Wolf | F16B 12/56 |
| | | | | | 5/290 |
| 7,865,981 | B2 | * | 1/2011 | Harrow | A47C 19/005 |
| | | | | | 5/200.1 |
| 2008/0207338 | A1 | * | 8/2008 | Mende | F16F 15/13142 |
| | | | | | 464/68.1 |

* cited by examiner

*Primary Examiner* — Eric K Kurilla
*Assistant Examiner* — James T Coble
(74) *Attorney, Agent, or Firm* — Sheppard, Mullin, Richter & Hampton LLP

(57) ABSTRACT

A corner locking mechanism for a bed base that has corners formed by respective adjacent mating side panels and end panels is provided. The corner locking mechanism has a first section including a first top wall, a first outer wall orthogonal to the first top wall, and a first inner wall extending orthogonally from the first top wall. The corner locking mechanism also has a second section extending orthogonally from the first section, the second section including a second top wall, a second outer wall extending orthogonally from the second top wall, and a second inner wall spaced from the second outer wall and extending orthogonally from the second top wall. The first section is located over one of the side panel or the end panel at the corners.

16 Claims, 2 Drawing Sheets

BED BASE WITH LOCKING CORNER

TECHNICAL FIELD

Embodiments of the present invention relate to bases for beds, and more particularly to a corner lock for a bed base.

BACKGROUND OF THE INVENTION

Beds are typically supported by a bed base of some type. The bed base may support a box spring unit and a mattress. In the hospitality industry, a common bed base is one that extends from the bottom of the box spring unit to the floor. This design prevents objects from going under the box spring unit. This configuration is easier for cleaning, in that the underside of the bed is not accessible and therefore should remain clear of all objects. If one has ever tried to look under a bed in a typical hotel room, they will remember this configuration.

One disadvantage of bed bases, especially of this type, is the time to assemble and/or disassemble the bed base. On typical bed bases of this type, the end panels are coupled to corresponding side panels to create a rectangular base. To connect the rectangle, each corner typically has a top plate and a bottom plate that are coupled together with a bolt, washer and wing nut. This arrangement involves cost in the number of parts, and the time it takes to assemble them to the bed base. It would be beneficial to find a solution with less cost, both in terms of material cost, and labor cost in assembly or disassembly.

BRIEF DESCRIPTION OF THE INVENTION

A corner locking mechanism for a bed base that has corners formed by a respective adjacent mating side panel and end panel is provided. The corner locking mechanism has first section including a first top wall, a first outer wall extending orthogonally from the first top wall, and a first inner wall spaced from the first outer wall and extending orthogonally from the first top wall. The corner locking mechanism also has a second section extending orthogonally from the first section, the second section including a second top wall, a second outer wall extending orthogonally from the second top wall, and a second inner wall spaced from the second outer wall and extending orthogonally from the second top wall. The first section is located over one of the side panel or the end panel, and the second section is located over the other of the side panel or the end panel to secure the side panel with respect to the end panel.

Additional objects, advantages, and novel features of the invention will be set forth in part in the description that follows, and in part will become apparent to those skilled in the art upon examination of the following, or may be learned by practice of the invention.

BRIEF DESCRIPTION OF SEVERAL VIEWS OF THE DRAWINGS

The present invention is described in detail below with reference to the attached drawing figures, wherein.

DETAILED DESCRIPTION OF THE INVENTION

Embodiments of the present invention generally relate to a corner locking mechanism for a bed base that has corners formed by a respective adjacent mating side panel and end panel. The corner locking mechanism has a first section including a first top wall, a first outer wall extending orthogonally from the first top wall, and a first inner wall spaced from the first outer wall and extending orthogonally from the first top wall. The corner locking mechanism also has a second section extending orthogonally from the first section, the second section including a second top wall, a second outer wall extending orthogonally from the second top wall, and a second inner wall spaced from the second outer wall and extending orthogonally from the second top wall. The first section is located over one of the side panel or the end panel, and the second section is located over the other of the side panel or the end panel to secure the side panel with respect to the end panel.

In other aspects, a bed base is provided that includes spaced apart side panels and end panels that mate at respective corners to form a rectangular base. A corner locking mechanism is disposed over each corner of the rectangular base to hold the respective side panel and end panel forming the corner in place with respect to one another.

Figure 1:
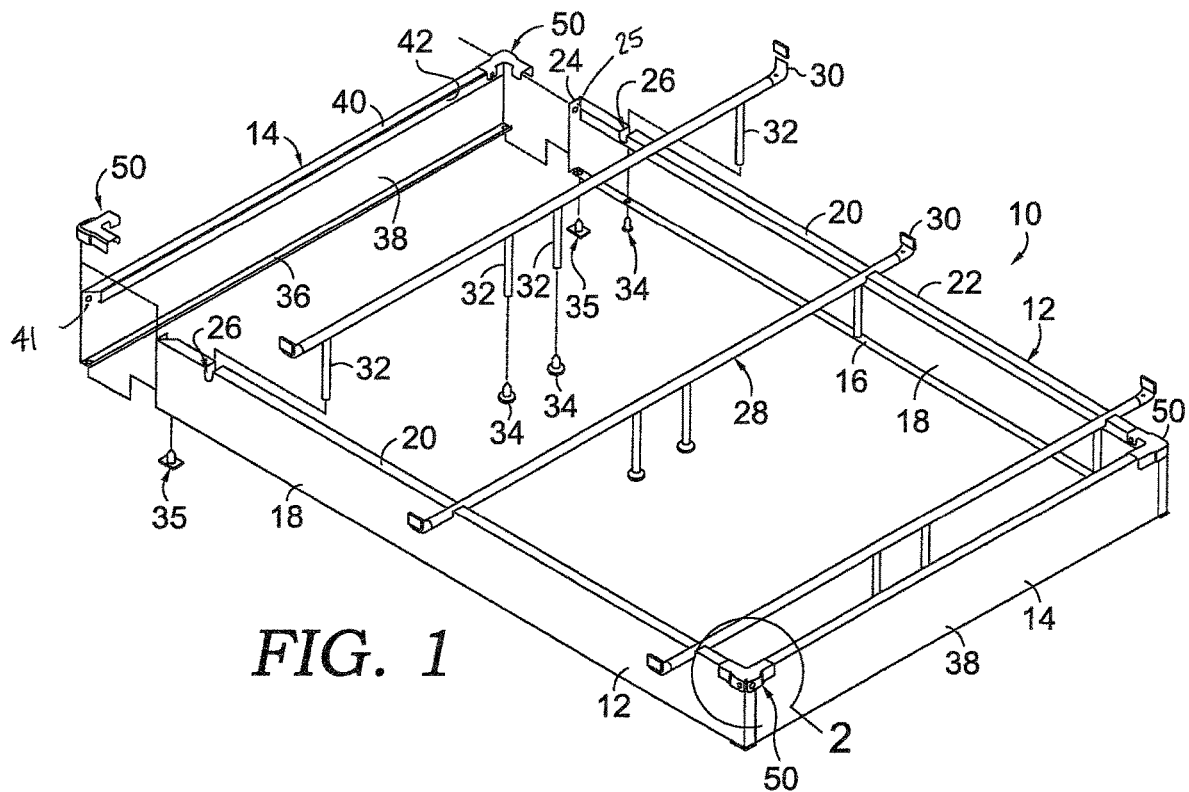
FIG. 1 is a perspective view of a partially assembled bed base with a corner lock in accordance with an embodiment of the invention.

A bed base 10 is shown in FIG. 1 that may be used to support, for example, a box spring and mattress (not shown). The bed base 10 includes a pair of spaced apart side panels 12 that are coupled to a pair of spaced apart end panels 14. Each side panel 12, in some aspects, includes a bottom lip 16 that extends generally parallel with a support surface (for example, the floor). A vertical face 18 extends upwardly from the bottom lip 16. At the top of the vertical face 18, a top lip 20 extends inwardly and is generally parallel to the bottom lip 16. In some aspects, each side panel 12 further has an inner lip 22 that extends downwardly from the top lip 20 and extends only partially towards bottom lip 16. In other words, the inner lip 22 is not co-extensive with vertical face 18. In some aspects, side panel 12 can be made from a single piece of material, such as a metal, and can be bent to the described shape. In some aspects, side panel 12 includes an overlap tab 24 that extends inwardly and is orthogonally oriented with respect to vertical face 18. Additionally, the top lip 20 and bottom lip 16 may terminate adjacent overlap tab 24 to form an angle with respect to vertical face 18. In other words, in some aspects there is a relief triangular portion at the end of each side panel 12. Tab 24 may have a hole 25 near the top of the tab 24, as seen in FIG. 1. As shown in FIG. 1, in some aspects, side panel 12 includes a series of cut-outs 26 that can be, for example, semi-circular in shape.

In the assembled condition, bed base 10 also includes a series of cross-tubes 28. Cross-tubes 28 can be constructed from tubular steel, for example, and have upwardly extending terminal end caps 30. In some aspects, the cross-tubes 28 are placed in the corresponding cut-outs 26, so that the top of cross-tube 28 is flush with the top lip 20 of the side panel 12. The cross-tubes 28 may have a series of downwardly extending legs 32 coupled thereto. As shown in FIG. 1, a pair of outer legs 32 extend downwardly through a hole in cut-out 26, adjacent vertical face 18, and are coupled to the side panel 12 with a glide 34 that is coupled to the bottom end of leg 32. In some aspects, the glide 34 extends through a hole in bottom lip 16 of side panel 12 and can be press-fit, threaded into, or otherwise coupled to leg 32. A pair of inner legs 32 may also have glides 34 coupled to the bottom thereof, to provide a smooth contact surface for legs 32 on the support surface (floor) for bed base 10.

Each end panel 14, in some aspects, includes a bottom lip 36 that extends generally parallel with a support surface (for example, the floor). A vertical face 38 extends upwardly from the bottom lip 36. At the top of the vertical face 38, a top lip 40 extends inwardly and is generally parallel to the bottom lip 36. In some aspects, each end panel 14 further has an inner lip 42 that extends downwardly from the top lip 40 and extends only partially towards bottom lip 36, so inner lip 42 is shorter than vertical face 38. In some aspects, end panel 14 can be made from a single piece of material, such as a metal, and can be bent to the described shape. Additionally, the top lip 40 and bottom lip 36 may terminate at each end of end panel 14 to form an angle with respect to vertical face 38. In other words, in some aspects there is a relief triangular portion at the end of each side panel 14. A hole 41 may be present on vertical face 38, near the end of end panel 14, as best seen in FIG. 1.

In the assembled condition, the end panels 14 are oriented orthogonally with respect to the side panels 12, with the angled ends of the end panels 14 nested within a corresponding overlap tab 24 of the side panels 12. In other words, the overlap tabs 24 extend or overlap a portion of the vertical face of the end panel 14. As best seen in FIG. 1, a glide 35 may extend through a hole in the bottom lip 16 of the side panel 12, and through a hole in the bottom lip 36 of end panel 14 in the bottom corner formed by an adjacent side panel 12 and end panel 14.

Figure 2:
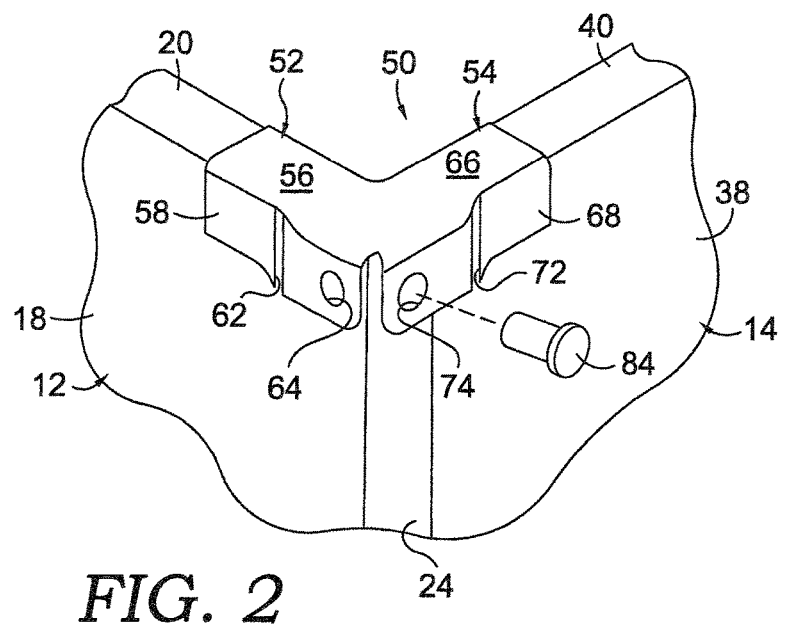
FIG. 2 is an enlarged view of the encircle region of FIG. 1.
Figure 3:
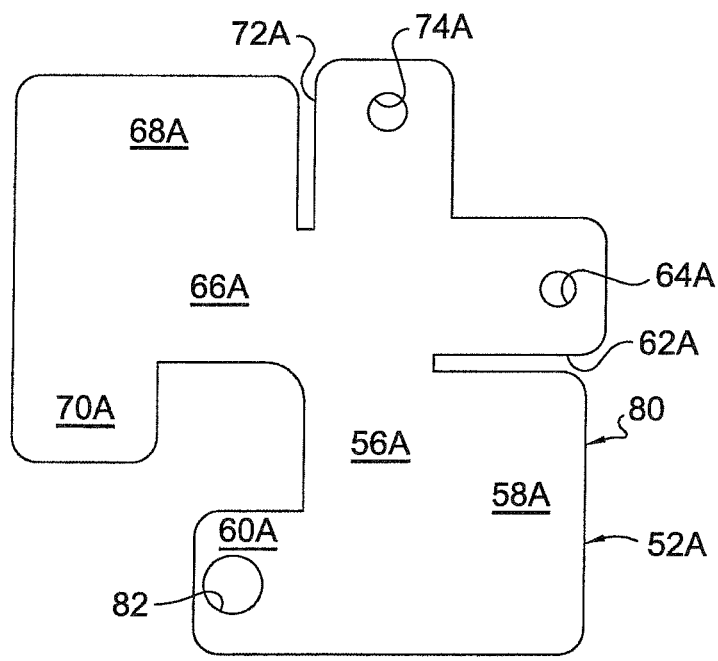
FIG. 3 is a view of the initial configuration of a blank for the corner lock in accordance with an embodiment of the invention.
Figure 4:
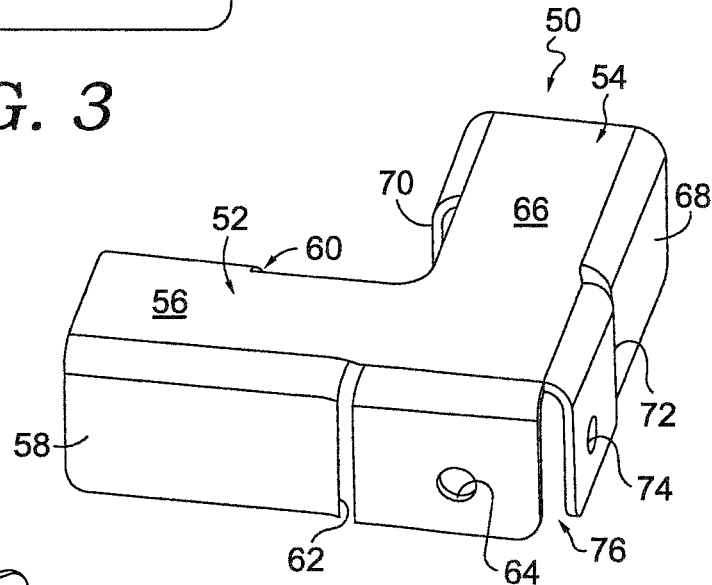
FIG. 4 is a perspective view of the corner lock in accordance with an embodiment of the invention.
Figure 5:
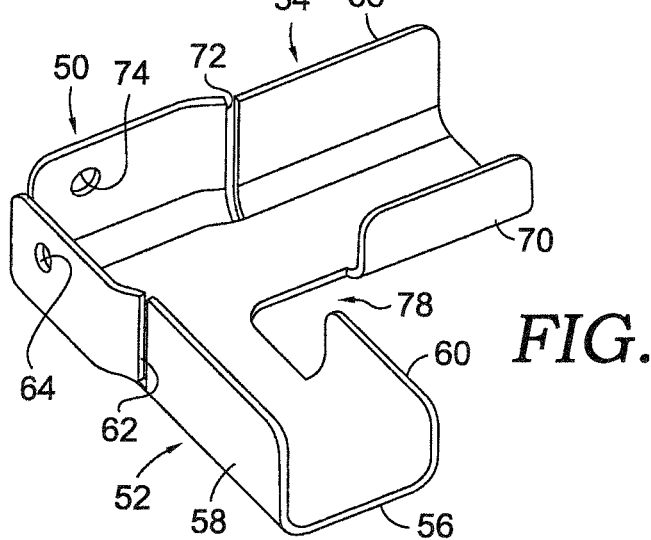
FIG. 5 is a perspective view similar to FIG. 4 but showing the corner lock from a different viewpoint.

Each formed corner of the bed base 10 includes a corner lock 50, as best seen in FIGS. 2-5. The corner lock 50 includes a first section 52 and a second section 54. The first section 52 includes a top wall 56, an outer wall 58 that extends downwardly from top wall 56 and an inner wall 60 that extends downwardly from the top wall 56. In some aspects, the outer wall 58 and the inner wall 60 are parallel to one another, and orthogonal to the top wall 56. As best seen in FIG. 4, the outer wall 58 may be formed with a relief cut 62 that extends between one region of outer wall 58 and the adjacent region of outer wall 58. In some aspects, relief cut 62 accommodates the overlap tab 24 of side panels 12, allowing outer wall 58 to remain adjacent the overlap tab 24 in the region of outer wall 58 extended by relief cut 62, and allowing outer wall 58 to remain adjacent vertical face 38 of end panel 14 in the other region of outer wall 58. As best seen in FIG. 4, the outer wall 58 includes a hole 64, the importance of which is described below. As best seen in FIG. 5, in some aspects the inner wall 60 extends only partially to the corner where first section 52 meets with second section 54. Additionally, in some aspects, inner wall 60 is not as tall as outer wall 58 (inner wall 60 does not extend as far away from top wall 56 as does outer wall 58).

The second section 54 includes a top wall 66, an outer wall 68 that extends downwardly from top wall 66 and an inner wall 70 that extends downwardly from the top wall 66. In some aspects, the outer wall 68 and the inner wall 70 are parallel to one another, and orthogonal to the top wall 66. As best seen in FIG. 4, the outer wall 68 may be formed with a relief cut 72 that extends between one region of outer wall 68 and the adjacent region of outer wall 68. In some corners, relief cut 72 accommodates the overlap tab 24 of side panels 12, allowing outer wall 68 to remain adjacent the overlap tab 24 in the region of outer wall 68 extended by relief cut 72, and allowing outer wall 68 to remain adjacent vertical face 38 of end panel 14 in the other region of outer wall 68. As best seen in FIG. 4, the outer wall 68 includes a hole 74, the importance of which is described below. As best seen in FIG. 5, in some aspects the inner wall 70 extends only partially to the corner where first section 52 meets with second section 54. Additionally, in some aspects, inner wall 70 is not as tall as outer wall 68 (inner wall 70 does not extend as far away from top wall 66 as does outer wall 68). As best seen in FIGS. 4 and 5, a gap 76 is formed between the end of outer wall 58 nearest hole 64 and the end of outer wall 68 nearest hole 74. Similarly, a gap 78 is formed between the inside end of inner wall 60 and the inside end of inner wall 70. In some aspects, gap 78 is larger than gap 76.

As seen in FIG. 3, corner lock 50 may initially be formed as a blank 80 from a progression die. The areas of blank 80 that correspond to those parts of corner lock 50 described above with respect to FIGS. 2, 4 and 5 are labeled with the corresponding number, followed by "A". So, first section 52 is labeled as 52A, and second section 54 is labeled as 54A, and so on. Also shown in FIG. 3 is a hole 82 that, in some aspects, is on either inner wall 60 or inner wall 70. Hole 82 is used to hang corner lock 50 during the painting or powder coating finishing process.

As best seen in FIG. 2, after side panels 12 are in place with end panels 14, each corner formed by an adjacent side panel 12 and end panel 14 is capped with a corner lock 50. Corner lock 50 is placed over the corner formed by an adjacent side panel 12 and end panel 14 such that top wall 56 and top wall 66 rest on top lip 20 and top lip 40. Outer wall 58 and outer wall 68 of corner lock 50 are adjacent one of vertical face 18 and vertical face 38. Additionally, inner wall 60 and inner wall 70 are adjacent one of inner lip 22 and inner lip 42. In this position, corner lock 50 is easily secured in place with a retaining pin 84. Retaining pin 84 is placed through hole 74, and through corresponding and aligned holes in the vertical faces of the side panel and end panel. In this way, corner lock 50 is secured in place on bed base 10 without the use of tools. Corner lock 50 is secured in place and maintains the side panels 12 and end panels 14 in place on bed base 10, and allows bed base 10 to be efficiently assembled. Similarly, the bed base 10 is easily disassembled, by removing retaining pin 84 (such as with a flat-head screw driver or other prying tool).

From the foregoing, it will be seen that this invention is one well adapted to attain all the ends and objects hereinabove set forth together with other advantages, which are obvious and inherent to the structure. It will be understood that certain features and subcombinations are of utility and may be employed without reference to other features and subcombinations. This is contemplated by and is within the scope of the claims. Since many possible embodiments may be made of the invention without departing from the scope thereof, it is to be understood that all matter herein set forth or shown in the accompanying drawings is to be interpreted as illustrative and not in a limiting sense.

The invention claimed is:

1. A corner locking mechanism for a bed base having corners formed by a respective adjacent mating side panel and end panel, the corner locking mechanism comprising:
    a first section including a first top wall, a first outer wall extending orthogonally from the first top wall, and a first inner wall spaced from the first outer wall and extending orthogonally from the first top wall; and a second section extending orthogonally from the first section, the second section including a second top wall, a second outer wall extending orthogonally from the second top wall, and a second inner wall spaced from the second outer wall and extending orthogonally from the second top wall;

wherein the first section is located over one of the side panel or the end panel, and the second section is located over the other of the side panel or the end panel to secure the side panel with respect to the end panel;

wherein the first outer wall includes a first hole positioned to mate with a hole in one of the side panel or the end panel and the second outer wall includes a second hole positioned to mate with a hole in one of the side panel or the end panel; and further comprising a retaining pin sized to fit within one of the first hole or the second hole, and wherein, when the retaining pin is placed through a selected one of the first hole or the second hole, and through the hole in the one of the side panel and the end panel, the corner locking mechanism is positively held in place relative to the side panel and the end panel by the retaining pin.

2. The corner locking mechanism of claim 1, wherein the first outer wall includes first region separated from a second region by a relief cut and the second outer wall includes a first region and a second region separated by a relief cut.

3. The corner locking mechanism of claim 1, wherein the first inner wall and the second inner wall are oriented orthogonally to one another, and converge toward one another but do not meet, forming an inner gap.

4. The corner locking mechanism of claim 3, wherein the first outer wall and the second outer wall are oriented orthogonally to one another, and converge toward one another but do not meet, forming an outer gap.

5. The corner locking mechanism of claim 4, wherein the inner gap is greater than the outer gap.

6. The corner locking mechanism of claim 1, wherein the inner walls have a height and the outer walls have a height, and wherein the height of the outer walls is greater than the height of the inner wall.

7. The corner locking mechanism of claim 1, wherein the respective adjacent mating side panel comprises an overlap tab and wherein the overlap tab overlaps the end panel to secure the side panel with respect to the end panel.

8. The corner locking mechanism of claim 7, wherein the first hole is positioned to mate with the hole of the side panel on the overlap tab.

9. A bed base, comprising corner locking mechanism for a bed base having corners formed by a respective adjacent mating side panel and end panel, the corner locking mechanism comprising:

a pair of spaced apart side panels;

a pair of spaced apart end panels oriented orthogonally to the side panels, wherein the side panels and the end panels form a rectangular base with four corners;

and four corner locking mechanisms, with one corner locking mechanism disposed over each of the four corners; each locking mechanism including:

a first section including a first top wall, a first outer wall extending orthogonally from the first top wall, and a first inner wall spaced from the first outer wall and extending orthogonally from the first top wall;

and a second section extending orthogonally from the first section, the second section including a second top wall, a second outer wall extending orthogonally from the second top wall, and a second inner wall spaced from the second outer wall and extending orthogonally from the second top wall;

wherein the first section of each corner locking mechanism is located over one of the side panel or the end panel forming a respective corner, and the second section is located over the other of the side panel or the end panel forming the respective corner to secure the side panel with respect to the end panel;

wherein the first outer wall includes a first hole positioned to mate with a hole in one of the side panel or the end panel and the second outer wall includes a second hole positioned to mate with a hole in the other of the side panel or the end panel;

further comprising a retaining pin sized to fit within one of the first hole or the second hole, and wherein, when the retaining pin is placed through a selected one of the first hole or the second hole, and through the hole in the one of the side panel and the end panel, the corner locking mechanism is positively held in place relative to the side panel and the end panel by the retaining pin.

10. The bed base of claim 9, wherein the first outer wall includes a relief cut and the second outer wall includes a relief cut.

11. The bed base of claim 9, wherein the first inner wall and the second inner wall are oriented orthogonally to one another, and converge toward one another but do not meet, forming an inner gap.

12. The bed base of claim 11, wherein the first outer wall and the second outer wall are oriented orthogonally to one another, and converge toward one another but do not meet, forming an outer gap.

13. The bed base of claim 12, wherein the inner gap is greater than the outer gap.

14. The bed base of claim 13, wherein the inner walls have a height and the outer walls have a height, and wherein the height of the outer walls is greater than the height of the inner wall.

15. The bed base of claim 9, wherein the pair of spaced apart side panels each comprise a pair of overlap tabs and wherein the pair of overlap tabs overlaps the pair of spaced apart end panels.

16. The bed base of claim 15, wherein the first hole is positioned to mate with the hole of the side panel on the overlap tab.

* * * * *